Patented Oct. 21, 1952

2,615,031

UNITED STATES PATENT OFFICE 2,615,031

PREPARATION OF CHROMIC SALTS

William A. Stover, Woodbury, N. J., assignor to Socony-Vacuum Oil Company, Incorporated, a corporation of New York No Drawing. Application July 18, 1950, Serial No. 174,594

12 Claims. (Cl. 260—438)

1

This invention relates to an improved process for preparing chromic salts of low molecular weight fatty acids and, more particularly, is concerned with a method for the production of chromic acetate.

Such salts have heretofore been prepared by dissolving chromic hydroxide in the fatty acid whose salt it is desired to produce. Thus, chromic acetate has been obtained by dissolving chromic hydroxide in acetic acid. This method has the disadvantage of necessitating preliminary preparation of chromic hydroxide involving precipitation of a solution of a chromic salt with caustic potash, soda, or ammonia and subsequent filtration and washing of the resulting precipitate. Such method is not at all attractive from a commercial standpoint. Other processes for preparing chromic acetate have included reduction of dichromates by reaction with various materials such as formaldehyde, sulfur dioxide, ethyl alcohol, and oxalic acid. Each of these processes, however, has certain inherent disadvantages. Thus, the use of formaldehyde in effecting reduction of dichromate in the presence of acetic acid is complicated by the formation of chromic-acetate formate. Reduction of dichromate with $SO_2$ followed by precipitation of the chromia so obtained and subsequent digestion in acetic acid entails the need for rather extensive filtration and washing equipment and, further, has the disadvantage of being a slow, time-consuming process. The use of ethyl alcohol as a reducing medium for dichromates in the presence of acetic acid has resulted in the formation of polymer impurities in the resulting chromic acetate. In the case of oxalic acid, enough oxalic acid must be present to satisfy the chromium oxalate complex in addition to the amount necessary for reduction. Such procedure is not only wasteful of oxalic acid but consumes some of the chromium present in solution which otherwise would be available for conversion to the desired chromic acetate.

It is an object of the present invention to provide an improved procedure for preparing chromic salts of low molecular weight fatty acids such as chromic acetate. Another object of this invention is the provision of a straightforward method for producing the above salts which is adaptable to commercial operation. A still further object is to provide a chromic salt preparation process unencumbered by the formation of complexes which result in the consumption of one or more of the chemicals initially employed and serve to decrease the yield of desired product.

These and other objects, which will be apparent to those skilled in the art, are attained in accordance with the instant invention wherein chromic fatty acid salts are prepared in a one-step operation by reduction of $Cr^{+6}$ to $Cr^{+3}$ with glycollic acid in the presence of the fatty acid whose salt is desired.

It has been discovered, in accordance with the process described herein, that glycollic acid in the presence of a fatty acid provides an effective reducing medium for conversion of a chromium compound in which chromium exhibits a valence of six to the chromic salt of the particular low molecular weight fatty acid present. The use of glycollic acid in the presence of a low molecular weight fatty acid results in the direct production of the chromic salt of said acid. While the description which follows hereinafter is directed particularly to the preparation of chromic acetate by reaction of glycollic acid, a dichromate, and acetic acid as the fatty acid, the instant method may likewise be employed with advantage in the production of the chromic salts of other low molecular weight fatty acids, the upper limit of molecular weight being defined by a mono-basic fatty acid having not over six carbon atoms.

The chromium reactant employed in the instant process is a water-soluble compound containing chromium of valence six. Representative compounds include chromium trioxide, the water-soluble metal chromates, and the water-soluble metal dichromates. The latter group of compounds, and in particular the alkali metal dichromates, are preferred for use in the present process. Particular preference is accorded sodium dichromate and potassium dichromate.

The procedure of the present process comprises contacting a chromium compound of the above type with a low molecular weight fatty acid and water, heating this mixture to a temperature of at least 130° F. and thereafter slowly adding glycollic acid. After the addition of glycollic acid, the resulting mixture is digested at an elevated temperature until evolution of carbon dioxide has ceased. Preferably, the temperature to which the initial mixture of chromium compound and fatty acid is heated should lie within the range 160 to 230° F., although with the use of pressure, higher temperatures may be employed. Glycollic acid is preferably added to the hot initial mixture slowly and gradually over a period generally not exceeding about 8 hours. Thereafter, the mixture is maintained at a temperature of about 180 to about 230° F. until the evolution of carbon dioxide ceases.

Having described in a general way the nature of this invention, the following specific examples will serve to illustrate the process described above:

*Example 1*

One hundred pounds of sodium dichromate, 109 pounds of water, and 121 pounds of glacial acetic acid were mixed and heated at atmospheric pressure in an open reaction vessel. After heating to a temperature of 170–220° F., 51 pounds of a 70% by weight aqueous solution of glycollic acid were slowly added over a period of ½ to 1 hour. Following the addition of glycollic acid, the reaction mixture was digested at a temperature of 210–220° F. until evolution of carbon dioxide from the reaction mixture ceased (2 hours). Upon completion of the reaction, the mixture analyzed as follows:

| Material | Wt. Percent |
| --- | --- |
| $Cr^{+6}$ | 0.55 |
| Total Cr | 8.07 |
| $Cr^{+3}$ | 7.52 |
| Total Acetic Acid | 27.3 |

The calculated acetate/$Cr^{+3}$ mole ratio of the above solution was 3 to 1. The small amount of $Cr^{+6}$ in the resulting mixture indicates that substantially complete reduction of sodium dichromate to chromic acetate was accomplished.

The following examples were carried out by the procedure of Example 1, that is, by adding glycollic acid to a boiling solution of sodium dichromate, water, and acetic acid. Reflux was continued as in Example 1 until evolution of carbon dioxide ceased. The ratio of reactants employed, analysis of the reaction mixture, and the yield of chromic acetate obtained are set forth in the following table:

| Example | 2 | 3 | 4 | 5 | 6 | 7 |
| --- | --- | --- | --- | --- | --- | --- |
| $Na_2Cr_2O_7 \cdot 2H_2O$, Percent Wt. final | 0.6 | 0.02 | 0.016 | 0.00 | 0.00 | 0.00 |
| $Cr^{+++}$, Percent Wt | 8.0 | 9.4 | 9.6 | 9.4 | 9.4 | 9.6 |
| Calc. $Cr(OAC)_3$, Percent Wt | 33.8 | 41.3 | 42.2 | 42.8 | 41.2 | 42.2 |
| Mole Ratio $HOAC/Na_2Cr_2O_7 \cdot H_2O$ charged | 2.0 | 5.2 | 5.5 | 5.7 | 6.0 | 8.0 |
| Calc. final mole ratio $HOAC/Cr^{+++}$ | 1.0 | 2.6 | 2.7 | 2.9 | 3.0 | 4.0 |
| Mole ratio glycollic acid/$Na_2Cr_2O_7 \cdot 2H_2O$ charged | 1.4 | 1.4 | 1.4 | 1.4 | 1.4 | 1.4 |
| pH | 7.5 | 5.0 | 4.9 | 4.8 | 4.7 | 4.1 |
| Calc. percent dichromate unreduced | 2.6 | 0.07 | 0.06 | 0.00 | 0.00 | 0.00 |

From the above table, it will be seen that the acetate/$Cr^{+3}$ ratios may be varied widely, extending from 1/1 to 4/1. However, with the lower acetate/$Cr^{+3}$ ratios, reduction is not complete. Accordingly, it is preferable to have an acetate/$Cr^{+3}$ ratio of at least about 2.5. With the of such a ratio, reduction of dichromate with glycollic acid in the presence of acetic acid under reflux provided better than 99% reduction and produced a more stable chromic acetate than is produced at lower temperatures.

Different ratios of glycollic acid to dichromate may be used to accomplish reduction of the dichromate but it has been found that most efficient reduction is obtained when about 1.4 moles of glycollic acid were reacted with 1 mole of dichromate in the presence of acetic acid.

Examples following the procedure of Example 1 but employing different ratios of glycollic acid to dichromate and different reflux times are set forth in the table below:

| Example | 8 | 9 | 10 | 11 |
| --- | --- | --- | --- | --- |
| $Na_2Cr_2O_7 \cdot H_2O$, Percent Wt. final | 0.75 | 1.04 | 0.00 | 0.50 |
| $Cr^{+++}$, Percent Wt | 9.37 | 9.22 | 9.13 | 9.57 |
| Calc. $Cr(OAC)_3$, Percent Wt | 41.3 | 40.6 | 40.2 | 42.1 |
| Mole ratio - $HOAC/Na_2Cr_2O_7 \cdot 2H_2O$ charged | 6 | 6 | 6 | 6 |
| Mole ratio - glycollic acid/$Na_2Cr_2O_7 \cdot 2H_2O$ charged | 1.3 | 1.3 | 1.4 | 1.4 |
| Total hours reflux | 2.8 | 2 | 2 | 1 |
| pH | 4.7 | 4.6 | 4.8 | 4.7 |
| Calc. Wt. Percent dichromate unreduced | 2.72 | 3.80 | 0.00 | 1.80 |

From the above table, it will be seen that optimum reduction of the dichromate to chromic acetate was obtained at a 2-hour reflux using 1.4 moles of glycollic acid and 1 mole of sodium dichromate in the presence of acetic acid.

As set forth hereinabove, in addition to dichromates, various other chromium compounds having a valence of 6 may be employed as reactants in the process of this invention. The following example will serve to illustrate the use of chromic trioxide:

*Example 12*

To a flask equipped with a reflux condenser, 200 grams of chromium trioxide, 240 grams of acetic acid, and 500 grams of water were charged and heated to boiling. Thereafter, 154 grams of 70% by weight aqueous solution of glycollic acid were added slowly over a period of 1 hour while maintaining the mixture at reflux. After addition of glycollic acid was complete, the mixture was refluxed until evolution of carbon dioxide therefrom ceased. This required about 2 hours. Upon testing the resultant reaction mixture, reduction of the chromium trioxide was found to be substantially complete as evidenced by the characteristic chromic green color obtained by titration of a sample of the reaction mixture with $SO_2$ solution.

From the above examples, it will be seen that glycollic acid in the presence of a fatty acid, such as acetic, provides an effective reducing medium for conversion of a chromium compound in which chromium has a valence of 6 to the fatty acid chromic salt. In the presence of a low molecular weight fatty acid, such as acetic acid, the glycollic acid reduction is superior to that obtained with other organic acids, such as oxalic, tartaric, and citric, in that a relatively small excess of glycollic acid is required for complete reduction. In the case of oxalic acid, enough oxalic acid must be employed to satisfy the chromium-oxalate complex in addition to the amount necessary for reduction.

It is to be understood that the above description is merely illustrative of preferred embodiments of the invention of which many variations may be made within the scope of the following claims by those skilled in the art without departing from the spirit thereof.

I claim:

1. A process for preparing the chromic salt of a low molecular weight fatty acid, which comprises reducing $Cr^{+6}$ to $Cr^{+3}$ with glycollic acid in the presence of a mono-basic fatty acid having not more than six carbon atoms.

2. A process for preparing chromic acetate, which comprises reducing $Cr^{+6}$ to $Cr^{+3}$ with glycollic acid in the presence of acetic acid.

3. A process for preparing the chromic salt of a low molecular weight fatty acid, which comprises reducing a dichromate with glycollic acid in the presence of a mono-basic fatty acid having not more than six carbon atoms.

4. A process for preparing chromic acetate, which comprises reducing a dichromate with glycollic acid in the presence of acetic acid.

5. A process for preparing chromic acetate, which comprises reducing chromium trioxide with glycollic acid in the presence of acetic acid.

6. A process for preparing chromic salts of low molecular weight fatty acids, which comprises contacting a water-soluble metal dichromate with a mono-basic fatty acid having not more than six carbon atoms, heating the resulting mixture to a temperature of at least 130° F., adding glycollic acid to the heated mixture, and after completing the addition of glycollic acid, digesting the mixture at an elevated temperature until evolution of carbon dioxide therefrom has ceased.

7. A process for preparing chromic salts of low molecular weight fatty acids, which comprises heating a mixture of water, mono-basic fatty acid having not more than six carbon atoms, and a water-soluble metal dichromate to a reflux temperature within the range 160 to 230° F., adding glycollic acid to the heated mixture and thereafter digesting the mixture at a reflux temperature until evolution of carbon dioxide therefrom ceases.

8. A process for preparing chromic acetate, which comprises contacting a water-soluble metal dichromate with acetic acid, heating the resulting mixture to a temperature of at least 130° F., adding glycollic acid to the heated mixture, and after completing the addition of glycollic acid, digesting the mixture at an elevated temperature until evolution of carbon dioxide therefrom has ceased.

9. A process for preparing chromic acetate, which comprises heating a mixture of water, acetic acid, and a water-soluble metal dichromate to a reflux temperature within the range 160 to 230° F., adding glycollic acid to the heated mixture and thereafter digesting the mixture at a reflux temperature until evolution of carbon dioxide therefrom ceases.

10. A process for preparing chromic acetate, which comprises contacting an alkali metal dichromate with acetic acid, heating the resulting mixture to a temperature of at least 130° F., gradually adding to the heated mixture about 1.4 moles of glycollic acid for each mole of alkali metal chromate contained therein, and thereafter digesting the mixture at reflux temperature until evolution of carbon dioxide therefrom ceases.

11. A process for preparing the chromic salt of a low molecular weight fatty acid, which comprises contacting an alkali metal dichromate with a mono-basic fatty acid having not more than six carbon atoms, heating the resulting mixture to a temperature within the range 160 to 230° F., adding to the heated mixture about 1.4 moles of glycollic acid for each mole of alkali metal chromate contained therein and thereafter digesting the mixture at a temperature of about 180 to about 230° F. until evolution of carbon dioxide therefrom is substantially complete.

12. A process for preparing chromic acetate, which comprises heating a mixture of water, acetic acid, and sodium dichromate to a temperature within the range 160 to 230° F., adding to the heated mixture approximately 1.4 moles of glycollic acid for each mole of sodium dichromate contained therein and thereafter digesting the mixture at reflux temperature for a period of about two hours.

WILLIAM A. STOVER.

REFERENCES CITED

The following references are of record in the file of this patent:

UNITED STATES PATENTS

| Number | Name | Date |
| --- | --- | --- |
| 2,428,356 | Chester | Oct. 7, 1947 |

OTHER REFERENCES

Gasser et al. C. A. vol. 23 p. 1584 (See also J. Faculty Ag. Hokkaido Imp. Univ. 24 No. 1, 25–38, 1928).